(12) United States Patent
Muramatsu (10) Patent No.: US 7,900,738 B2
(45) Date of Patent: Mar. 8, 2011

(54) ENGINE SUPPORTING DEVICE FOR A MOTORCYCLE

(75) Inventor: Takayoshi Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 330 days.

(21) Appl. No.: 11/087,992

(22) Filed: Mar. 22, 2005

(65) Prior Publication Data

US 2005/0218290 A1 Oct. 6, 2005

(30) Foreign Application Priority Data

Mar. 30, 2004 (JP) ................................ 2004-098070

(51) Int. Cl.
*F16M 13/00* (2006.01)
*B62D 21/00* (2006.01)

(52) U.S. Cl. ......... 180/311; 180/219; 180/225; 180/228; 248/610; 248/674

(58) Field of Classification Search .................. 248/674, 248/675, 589, 591, 610, 637, 672; 180/228, 180/229, 219, 311, 218, 225, 281.1, 312; 123/195 R, 195 A, 195 AC, 196 R; 280/281.1, 280/279, 284

See application file for complete search history.

(56) References Cited

U.S. PATENT DOCUMENTS

| | | | | |
|---|---|---|---|---|
| 4,593,656 A | * | 6/1986 | Shibata et al. | 123/184.47 |
| 5,531,289 A | * | 7/1996 | Muramatsu | 180/227 |
| 6,360,839 B1 | * | 3/2002 | Urano et al. | 180/229 |
| 6,695,089 B2 | * | 2/2004 | Adachi et al. | 180/311 |
| 7,171,938 B2 | * | 2/2007 | Muramatsu | 123/196 R |
| 7,201,246 B2 | * | 4/2007 | Brendelson et al. | 180/228 |
| 2005/0217631 A1 | * | 10/2005 | Muramatsu | 123/196 R |
| 2005/0218290 A1 | * | 10/2005 | Muramatsu | 248/674 |

FOREIGN PATENT DOCUMENTS

JP 05-039077 2/1993

* cited by examiner

*Primary Examiner* — Tan Le
(74) *Attorney, Agent, or Firm* — Keating & Bennett, LLP (57) ABSTRACT

An engine supporting device for a motorcycle includes a first frame section having a head pipe portion supporting a front fork, a second frame section supporting a rear arm and connected to the first frame section and an engine supported between the first and second frame sections and having a standing cylinder section. The second frame section has an extension made from a forged product and extends toward a region above the cylinder section of the engine. A hanger bracket that suspends the cylinder section is mounted to the extension.

15 Claims, 14 Drawing Sheets

ENGINE SUPPORTING DEVICE FOR A MOTORCYCLE

BACKGROUND OF THE INVENTION

1. Field of the Invention

This invention relates to an engine supporting device for a motorcycle for suspending a cylinder head of an engine with a hanger bracket mounted to a frame, and particularly to the mounting structure of the hanger bracket.

2. Description of Related Art

In a motorcycle with an engine having a standing cylinder section, a hanger bracket for suspending the cylinder section is mounted to a frame member passing above the cylinder section. The hanger bracket protrudes downwardly from the frame member and is connected, at the lower end, to the upper end of the cylinder section.

The frame member supporting the hanger bracket connects a main pipe extending rearwardly from a steering head pipe and a rear arm bracket for supporting a rear arm therebetween. A conventional frame member has an upper plate and a lower plate. The upper and lower plates are welded, with their edges in abutment against each other, to be formed in a hollow, box-like shape, and a pair of collars are welded to the lower end of the lower plate. The hanger bracket is fixed to the collar of the lower plate through bolts.

In a conventional device, the hanger bracket for suspending the cylinder section is subjected to a primary vibration of the engine. Since this vibration is transmitted to a frame member for supporting the hanger bracket, rigidity of the frame member has to be secured sufficiently for the engine to be suspended firmly.

However, since in conventional frame members, the upper and lower plates are made from sheet metal stamping parts or cast products, deformation can be produced when a large load is applied. Therefore, particular reinforcement measures have to be taken such as increasing the thickness of the upper and lower plates.

Therefore, the mounting portion of the hanger bracket becomes heavier and larger, resulting in an adverse affect on the moving performance of the motorcycle.

In view of the foregoing, an advantage of this invention is to provide an engine supporting device for a motorcycle in which the mounting portion of a hanger bracket can be formed light and compact.

SUMMARY OF THE INVENTION

In order to achieve the foregoing advantage, the engine supporting device for an motorcycle according to an embodiment of this invention includes a first frame section having a head pipe portion supporting a front fork, a second frame section supporting a rear arm and connected to the first frame section and an engine supported between the first and second frame sections and having a standing cylinder section.

The engine supporting device is characterized in that the second frame section has an extension made from a forged product and extending toward a region above the cylinder section of the engine, and a hanger bracket for suspending the cylinder section is mounted to the extension.

According to this invention, the rigidity of the mounting portion of the hanger bracket can be secured without the need of taking particular reinforcement measures such as increasing the thickness of the second frame section. Therefore, the mounting portion of the hanger bracket can be formed light and compact and the cylinder section of the engine can be suspended firmly.

DETAILED DESCRIPTION OF THE INVENTION

Now, a first embodiment of the present invention will be described with reference to FIG. 1 through FIG. 11.

Figure 1:
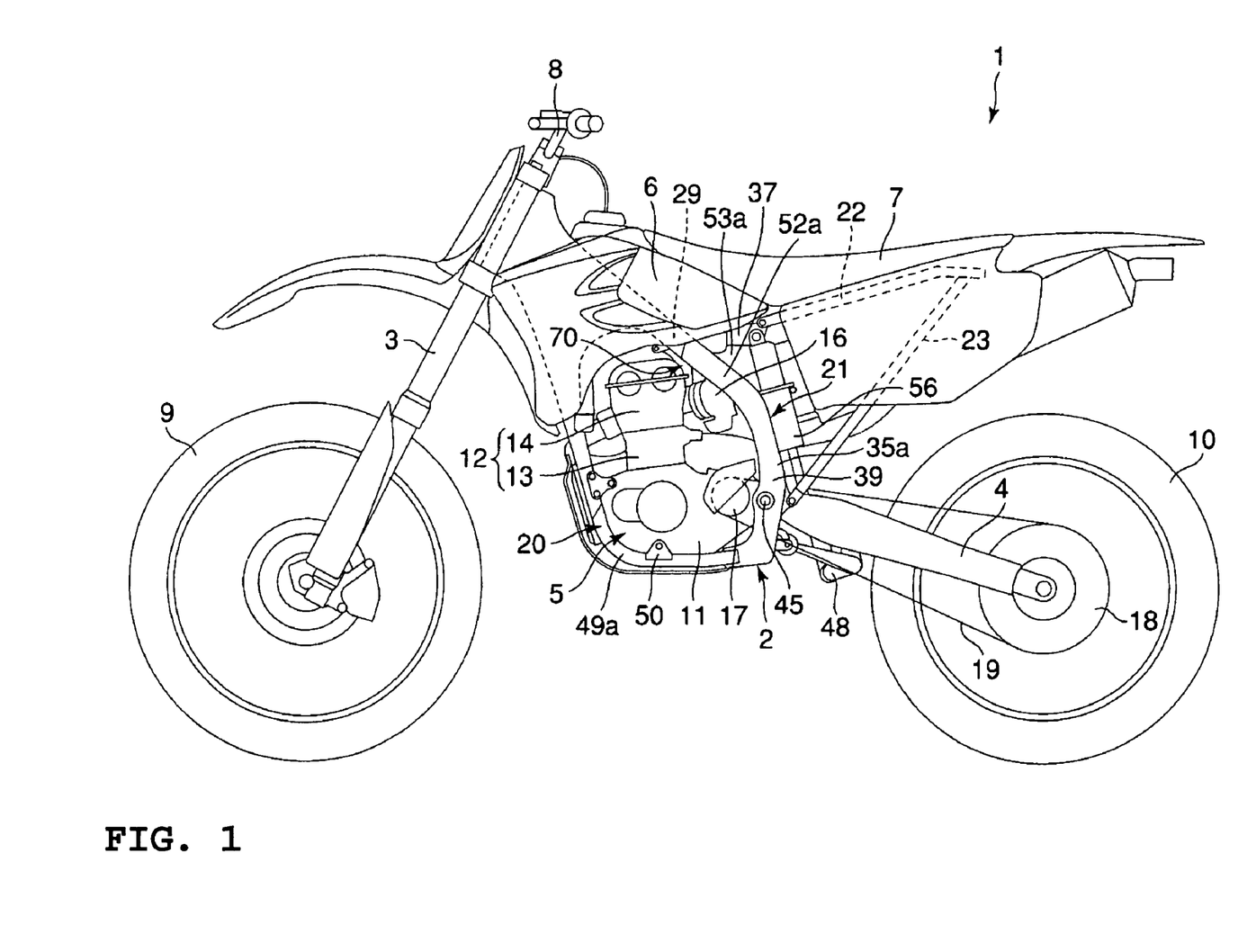
FIG. 1 is a side view of a motorcycle according to a first embodiment of the present invention.

FIG. 1 shows a motorcycle 1, for example, for a motocross race. The motorcycle 1 is provided with a frame 2 of a cradle type. The frame 2 supports a front fork 3; a rear arm 4; a water-cooled, four-stroke, single cylinder engine 5; a fuel tank 6; and a seat 7.

The front fork 3 is controlled for steering by a bar handle 8 and supports a front wheel 9. The rear arm 4 extends rearwardly from the frame 2 and supports, at its rear end, a rear wheel 10.

Figure 2:
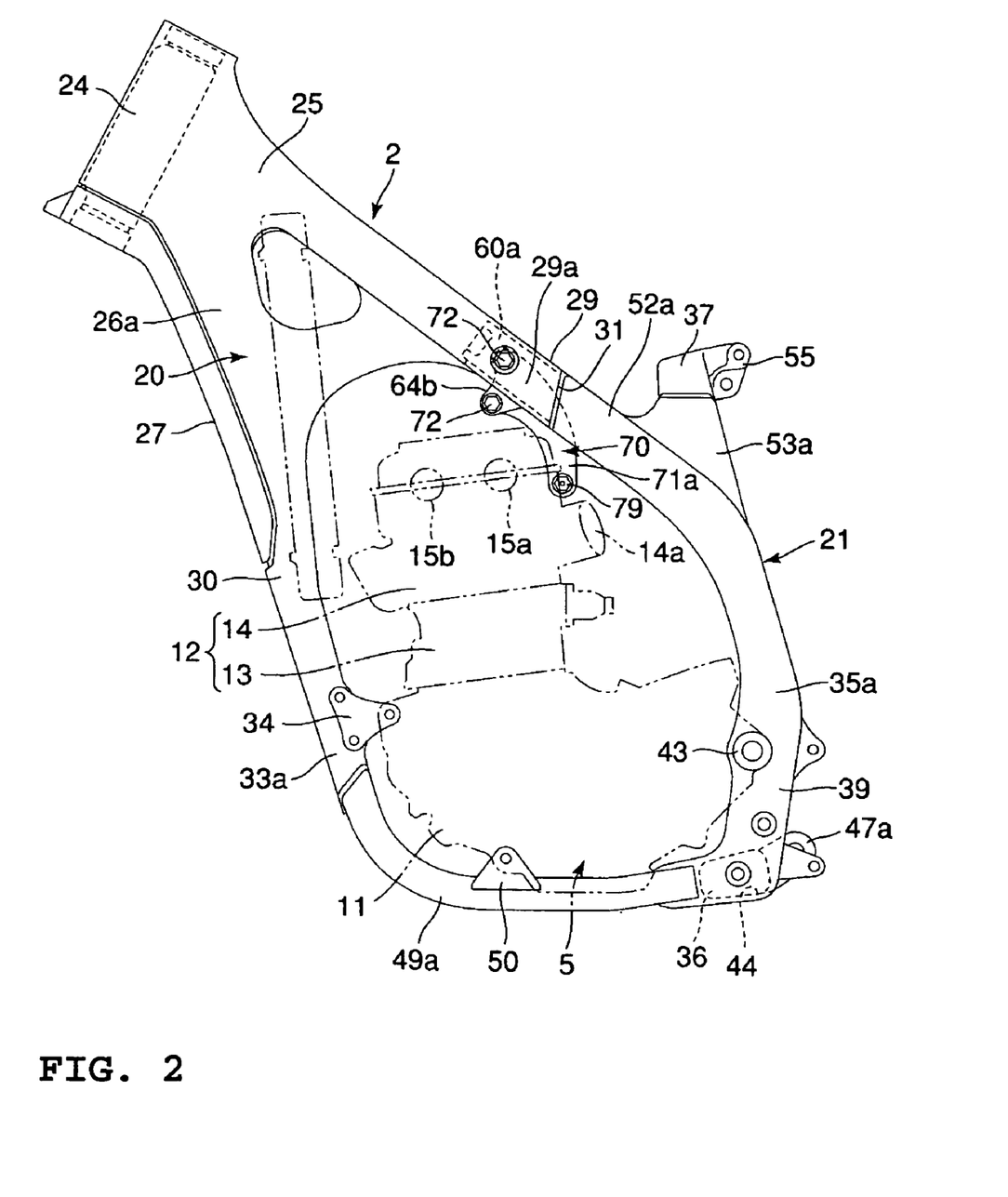
FIG. 2 is a side view of a frame according to the first embodiment of the present invention.

The engine 5 is provided with a crankcase 11, and a cylinder section 12 standing approximately upright from the crankcase 11. The cylinder section 12 includes a cylinder block 13 connected to the top of the crankcase 11, and a cylinder head 14 covering the cylinder block 13 at the upper end. As shown in FIG. 2, the cylinder head 14 supports an intake cam shaft 15a and an exhaust cam shaft 15b. The cam shafts 15*a*, 15*b* extend laterally of the vehicle and are disposed separate from each other longitudinally of the cylinder head 14.

The cylinder head 14 supports a spark plug (not shown). The spark plug is located on the bore centerline of the cylinder block 13 and removable from between the cam shafts 15*a*, 15*b* upwardly of the cylinder head 14.

Further, the cylinder head 14 has an intake port 14*a* at its rear face. A carburetor 16 is connected to the intake port 14*a*. The carburetor 16 is located in the rear of the cylinder head 14.

The engine 5 is used for driving the rear wheel 10 and has a drive sprocket 17 at the rear end of the crankcase 11. A chain 19 is stretched over the drive sprocket 17 and a driven sprocket 18 of the rear wheel 10.

Figure 3:
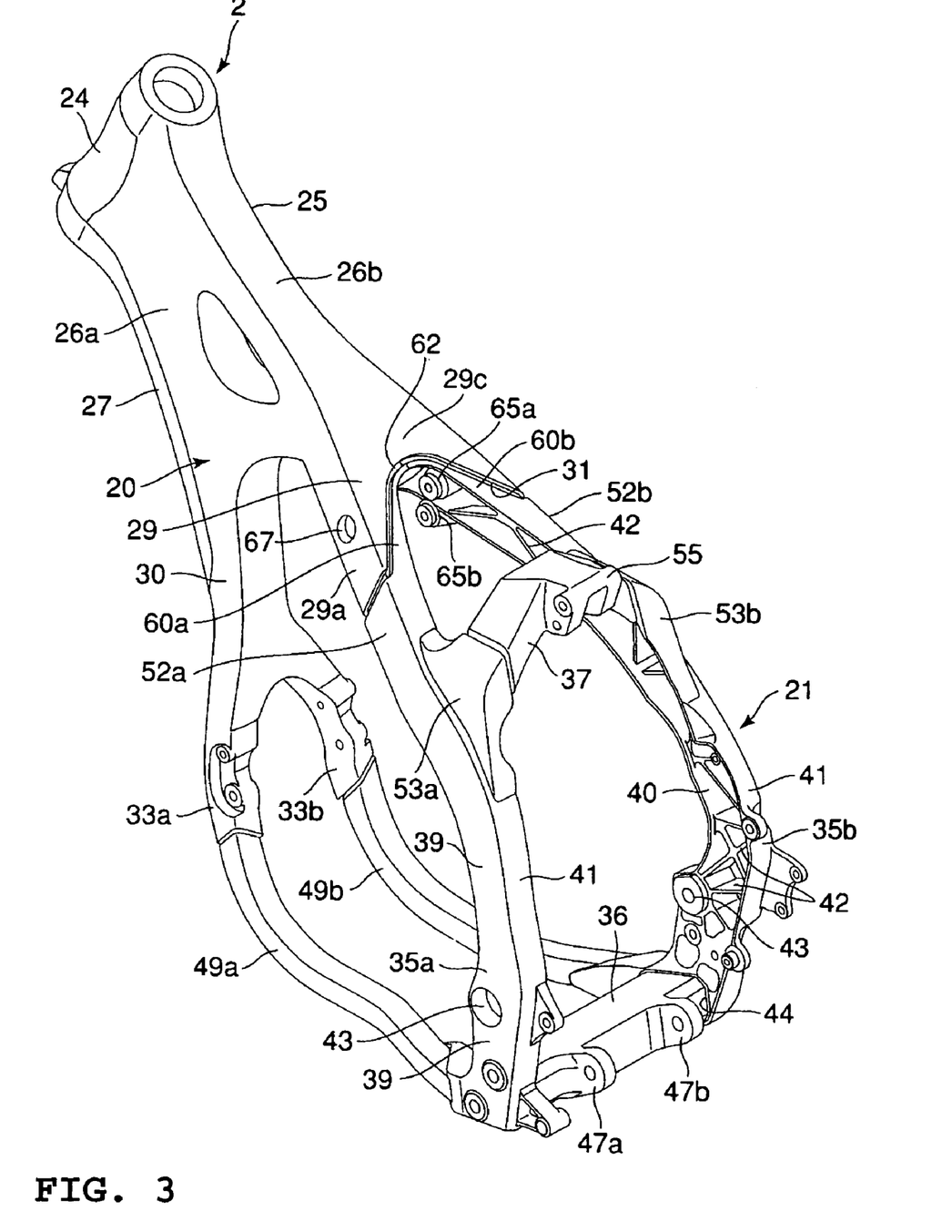
FIG. 3 is a perspective view of the frame according to the first embodiment of the present invention.

As shown in FIG. 1 through FIG. 3, the frame 2 is provided with a first frame section 20; a second frame section 21; left and right seat rails 22; and left and right seat pillar tubes 23.

The first frame section 20 is a cast product of an aluminum alloy and provided with a head pipe portion 24 and a gusset portion 25. The head pipe portion 24 is located at the forward end of the frame 2 and supports the front fork 3.

The gusset portion 25 extends from the head pipe portion 24 obliquely downwardly toward the rear, forming a hollow, box-like shape vertically elongated in the direction of the height of the frame 2. Specifically, the gusset portion 25 has left and right side walls 26*a* and an upper wall 26*b*, and these walls 26*a*, 26*b* are integrated with the head pipe portion 24. A reinforcement member 27 is welded extending across the space between the forward edges of the side walls 26*a*. The reinforcement member 27 extends downwardly from the lower end of the head pipe portion 24. Therefore, the gusset portion 25 has the shape of a hollow, dosed cross-section, surrounded by the side walls 26*a*, upper wall 26*b* and reinforcement member 27.

Figure 4:
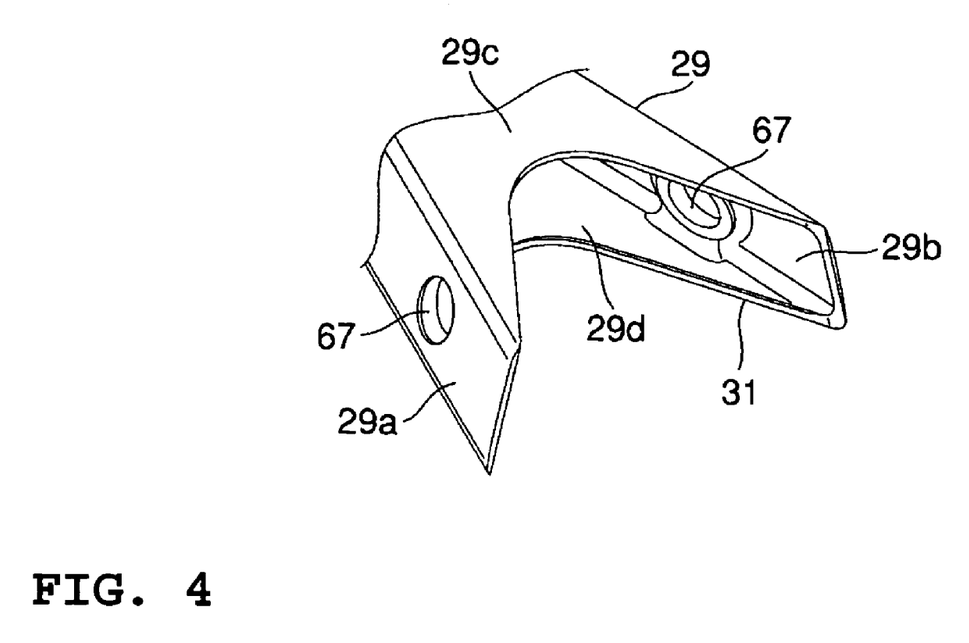
FIG. 4 is a perspective view of the connecting portion of a first frame section in the first embodiment of the present invention.

As shown in FIG. 2 and FIG. 3, the gusset portion 25 has a connecting portion 29 protruding obliquely downwardly toward the rear and a down tube 30 protruding downwardly. The connecting portion 29 is located directly above the cylinder head 14 of the engine 5. As shown in FIG. 4, the connecting portion 29 has left and right side walls 29*a*, 29*b*, an upper wall 29*c* and a lower wall 29*d*. The side walls 29*a*, 29*b* of the connecting portion 29 adjoin the side walls 26*a* of the gusset portion 25. The upper wall 29*c* of the connecting portion 29 extends across the space between the upper edges of the side walls 29*a*, 29*b* and adjoins the upper wall 26*b* of the gusset portion 25. The lower wall 29*d* of the connecting portion 29 extends across the space between the lower edges of the side walls 29*a*, 29*b*. In addition, the side walls 29*a*, 29*b* are inclined in directions in which they diverge from each other toward the rear of the gusset portion 25. Therefore, the connecting portion 29 is in the shape of a square box expanded laterally of the vehicle and has, at its rear end, an opening 31 opening rearwardly.

As shown in FIG. 4, the opening 31 is defined by the rear edges of the side walls 29*a*, 29*b*, rear edge of the upper wall 29*c* and rear edge of the lower wall 29*d*. The rear edge of the upper wall 29*c* and that of the upper wall 29*d* are cut off so as to be recessed in the shape of a letter V toward the head pipe portion 24.

The down tube 30 of the gusset portion 25 is located in the front of the engine 5. The down tube 30 is in the shape of a rectangular tube and has, at its lower end, a pair of forked connecting arms 33*a*, 33*b*. The connecting arms 33*a*, 33*b* are located in front of the crankcase 11 of the engine 5. An engine bracket 34 is mounted to each of the connecting arms 33*a*, 33*b*. The engine bracket 34 supports the forward end of the crankcase 11.

Figure 5:
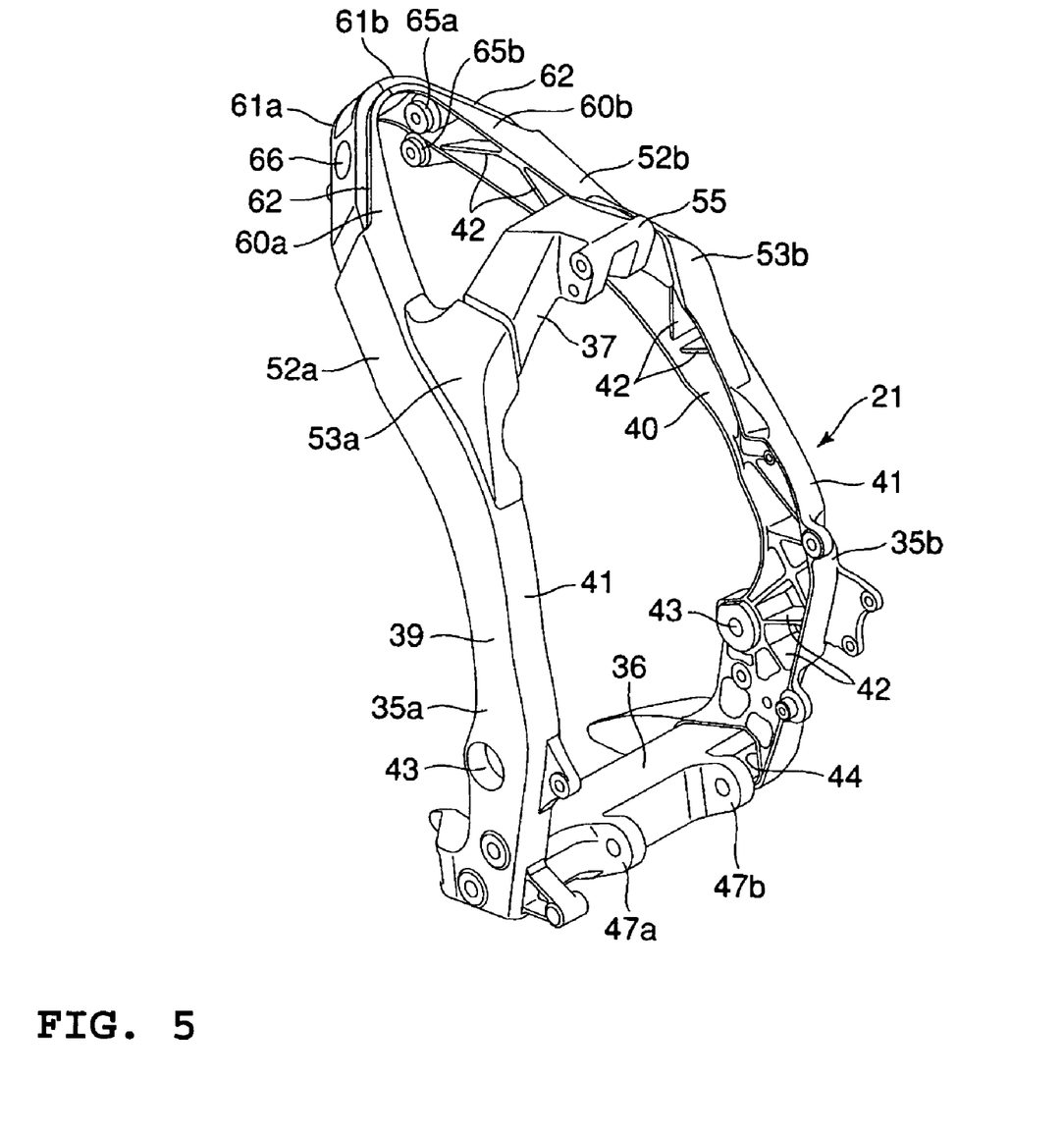
FIG. 5 is a perspective view of a second frame section according to the first embodiment of the present invention.

As shown in FIG. 2, FIG. 3 and FIG. 5, the second frame section 21 is provided with a pair of rear arm brackets 35*a*, 35*b*, a cross member 36, and a rear cushion bracket 37. The rear arm brackets 35*a*, 35*b* are formed from forged products of an aluminum alloy. The rear arm brackets 35*a*, 35*b* stand behind the engine 5 in the direction of the height of the frame 2 and are disposed parallel, and separate from each other laterally of the vehicle.

Figure 6:
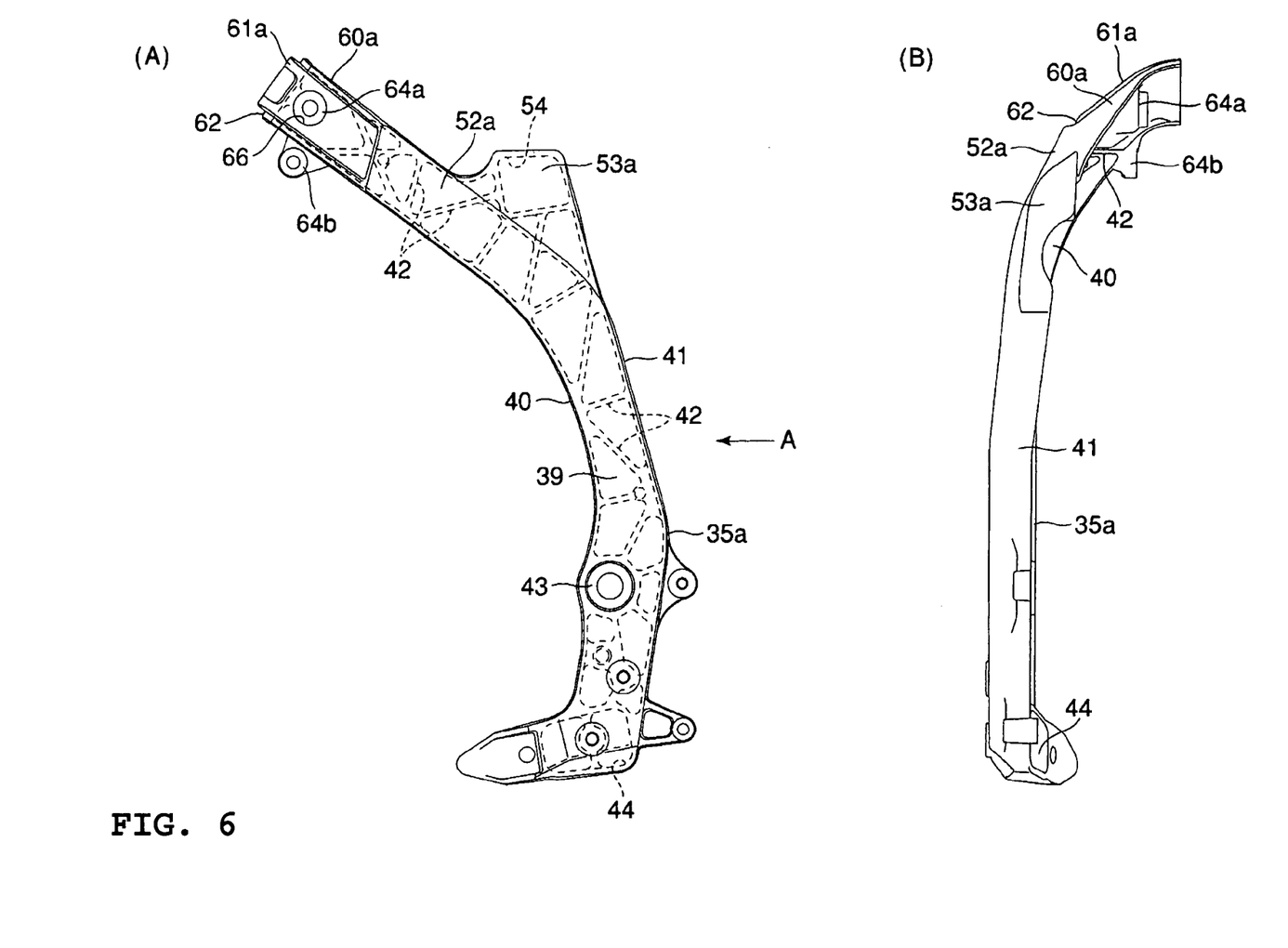
FIG. 6(A) is a side view of a left rear arm bracket in the first embodiment of the present invention.
FIG. 6(B) is a rear view of the rear arm bracket as viewed in the direction of line A of FIG. 6(A).
Figure 7:
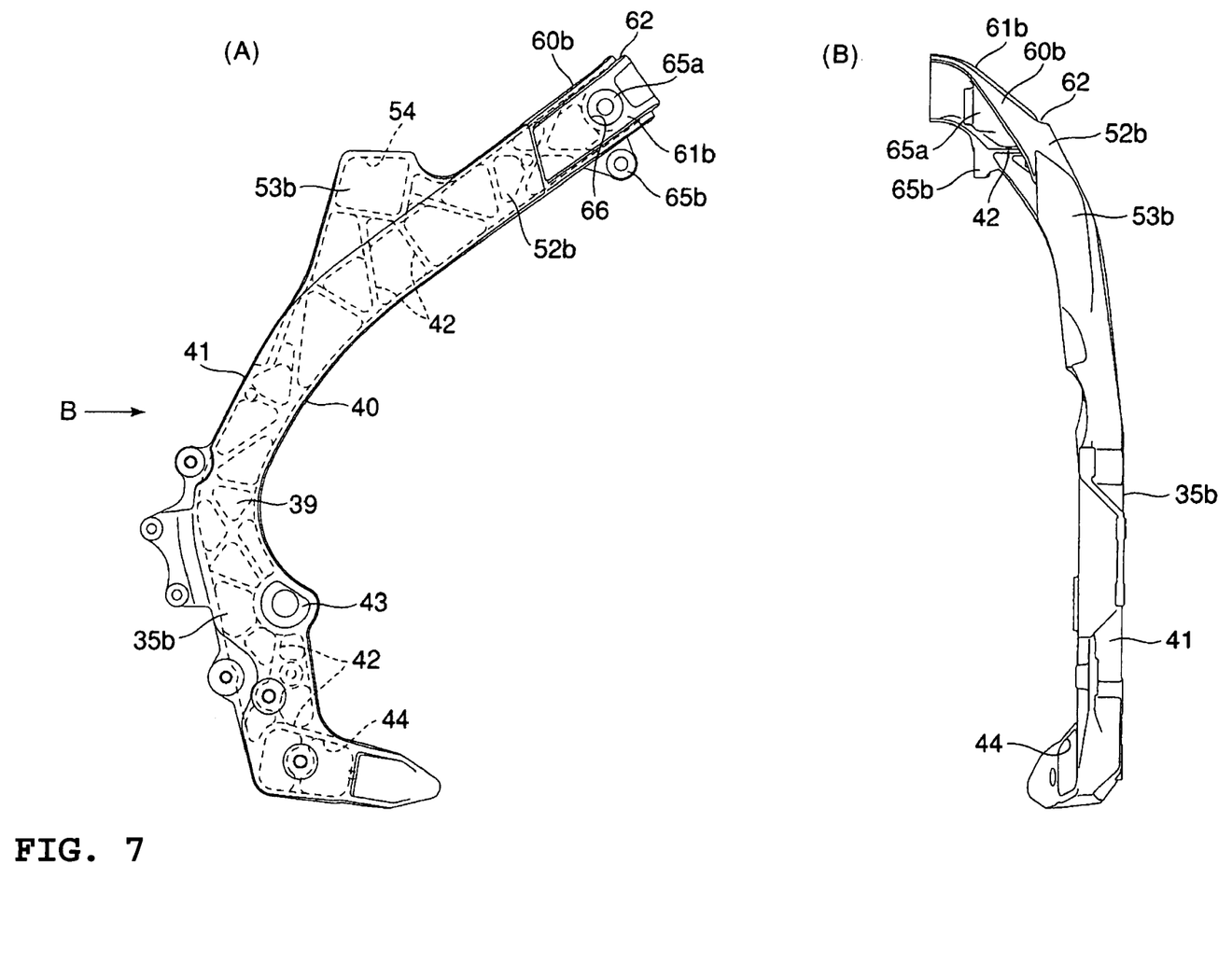
FIG. 7(A) is a side view of a right rear arm bracket in the first embodiment of the present invention.
FIG. 7(B) is a rear view of the rear arm bracket as viewed in the direction of line B of FIG. 7(A).

As shown in FIG. 5 through FIG. 7, each of the rear arm brackets 35*a*, 35*b* has a side wall 39, a front wall 40 and a rear wall 41. The side wall 39 faces sideways of the frame 2 and extends approximately in a belt-like shape in the direction of the height of the frame 2. The front wall 40 extends inwardly in the lateral direction of the vehicle from the forward edge of the side wall 39. Likewise, The rear wall 41 extends inwardly in the lateral direction of the vehicle from the rear edge of the side wall 39. Therefore, each of the rear arm brackets 35*a*, 35*b* has a U-shape in cross-section, opening inwardly in the lateral direction of the vehicle.

A plurality of reinforcement ribs 42 are formed integrally in the area surrounded by the side wall 39, front wall 40 and rear wall 41. The reinforcement ribs 42 reinforce the walls 39-41 from inside, whereby the rigidity of the rear arm brackets 35*a*, 35*b* is secured sufficiently.

Each of the rear arm brackets 35*a*, 35*b* has a cylindrical boss 43 and a fitting recess 44. The boss 43 is located in the rear of the crankcase 11. The rear end of the crankcase 11 and the forward end of the rear arm 4 are placed between the boss 43 of the rear arm bracket 35*a* and the boss 43 of the rear arm bracket 35*b* and supported by the bosses 43 through a pivot shaft 45. The fitting recesses 44 are located at the lower ends of the rear arm brackets 35*a*, 35*b*, respectively, and open inwardly in the lateral directions of the vehicle.

The cross member 36 is formed from an extruded material of an aluminum alloy, in the shape of a rectangular tube. One end of the cross member 36 is fitted in the fitting recess 44 of one rear arm bracket 35*a*, to be welded. The other end of the cross member 36 is fitted in the fitting recess 44 of the other rear arm bracket 35*b*, to be welded. Therefore, the cross member 36 connects the lower ends of the rear arm brackets 35*a*, 35*b* therebetween.

The cross member 36 has a pair of supporting portions 47*a*, 47*b* protruding rearwardly. The supporting portions 47*a*, 47*b* are carved out integrally from the cross member 36, and disposed parallel, and separate from each other laterally of the vehicle. A link mechanism 48 extends between these supporting portions 47*a*, 47*b* and the rear arm 4.

As shown in FIG. 2 and FIG. 3, the lower ends of the rear arm brackets 35*a*, 35*b* are connected to the connecting arm 33*a*, 33*b* of the down tube 30 through a pair of lower tubes 49*a*, 49*b*. The lower tubes 49*a*, 49*b* extend longitudinally of the frame 2, passing below the crankcase 11 of the engine 5 and are disposed separate from each other laterally of the vehicle. The forward ends of the lower tubes 49*a*, 49*b* are welded to the connecting arms 33*a*, 33*b* of the down tube 30. The rear ends of the lower tubes 49*a*, 49*b* are welded to the lower ends of the rear arm brackets 35*a*, 35*b*.

In the middle of each of the lower tubes 49*a*, 49*b* is welded an engine bracket 50 protruding upwardly. The engine bracket 50 supports the lower end of the crankcase 11. Therefore, the down tube 30 and the lower tubes 49*a*, 49*b* are adapted to hold the crankcase 11 of the engine 5 inside.

As shown in FIG. 1 and FIG. 3, the rear arm brackets 35*a*, 35*b* have extensions 52*a*, 52*b*, respectively. The extensions 52a, 52b extend, passing behind the carburetor 16, from the upper end of the rear arm brackets 35a, 35b toward a region above the cylinder head 14. On the upper surfaces of the extensions 52a, 52b are formed receiving sections 53a, 53b protruding upwardly. The receiving sections 53a, 53b face each other in the lateral direction of the vehicle and have fitting recesses 54 as shown in FIG. 6(A) and FIG. 7(A), respectively. The fitting recess 54 opens inwardly in the lateral direction of the vehicle.

The rear cushion bracket 37 is a cast product of an aluminum alloy and in the shape of a rectangular tube. The rear cushion bracket 37 is fitted, at one end, in the fitting recess 54 of one receiving section 53a, to be welded. The rear cushion bracket 37 is fitted, at the other end, in the fitting recess 54 of the other receiving section 53b, to be welded. Therefore, the rear cushion bracket 37 connects the extensions 52a, 52b of the rear arm brackets 35a, 35b therebetween.

The rear cushion bracket 37 has, in its middle, a support section 55 protruding rearwardly. The support section 55 is located in the upper section of the rear arm 4 at the forward end. One hydraulic shock absorber 56 extends between the support section 55 and the link mechanism 48 connected to the rear arm 4.

As shown in FIG. 1, the support section 55 of the rear cushion bracket 37 supports the forward end of the seat rail 22. The seat rail 22 extends rearwardly from the support section 55 and supports the rear half of the seat 7. The seat pillar tube 23 extends between the rear end of the seat rail 22 and the lower parts of the rear arm brackets 35a, 35b and supports the rear end of the seat rail 22.

As shown in FIG. 3 and FIG. 5, the extensions 52a, 52b of the rear arm brackets 35a, 35b are formed by the side walls 39, front walls 40 and rear walls 41 of the rear arm brackets 35a, 35b elongated obliquely upwardly toward the front of the frame 2. Therefore, each of the extensions 52a, 52b has the U-shape in cross-section, opening inwardly in the lateral direction of the vehicle, and is reinforced by the reinforcement ribs 42 from inside.

Figure 8:
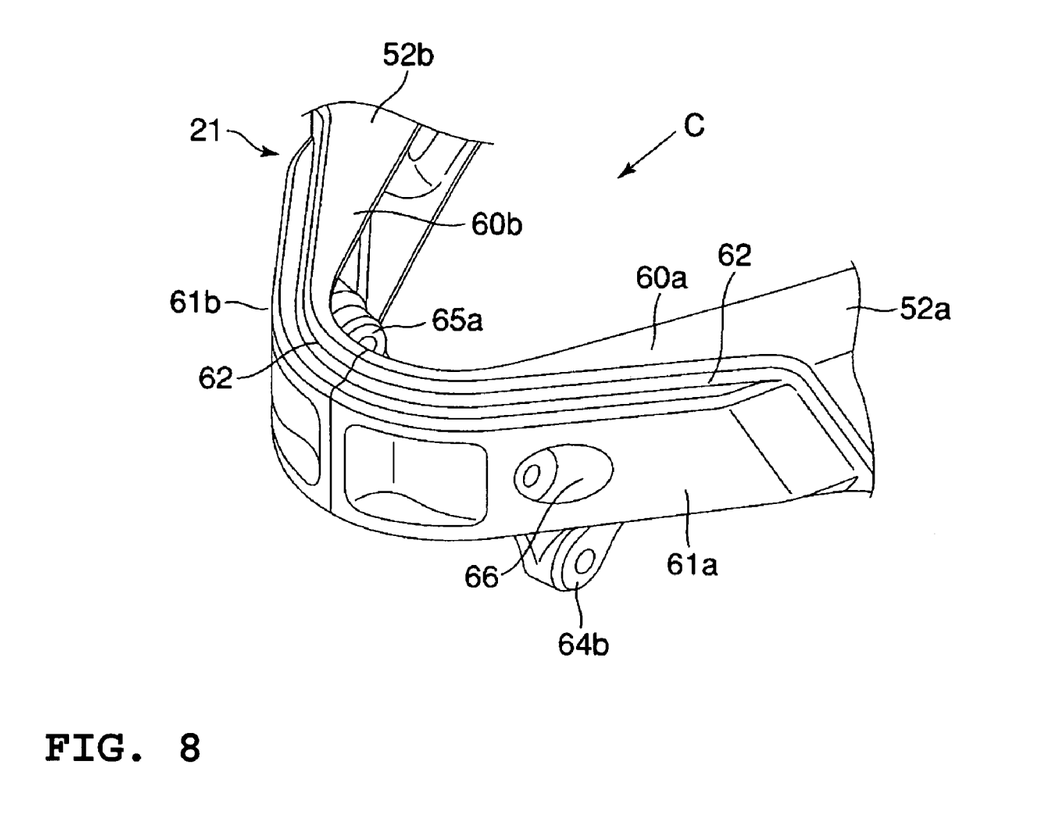
FIG. 8 is a perspective view of the forward end portion of extensions of the rear arm brackets in the first embodiment of the present invention.
Figure 9:
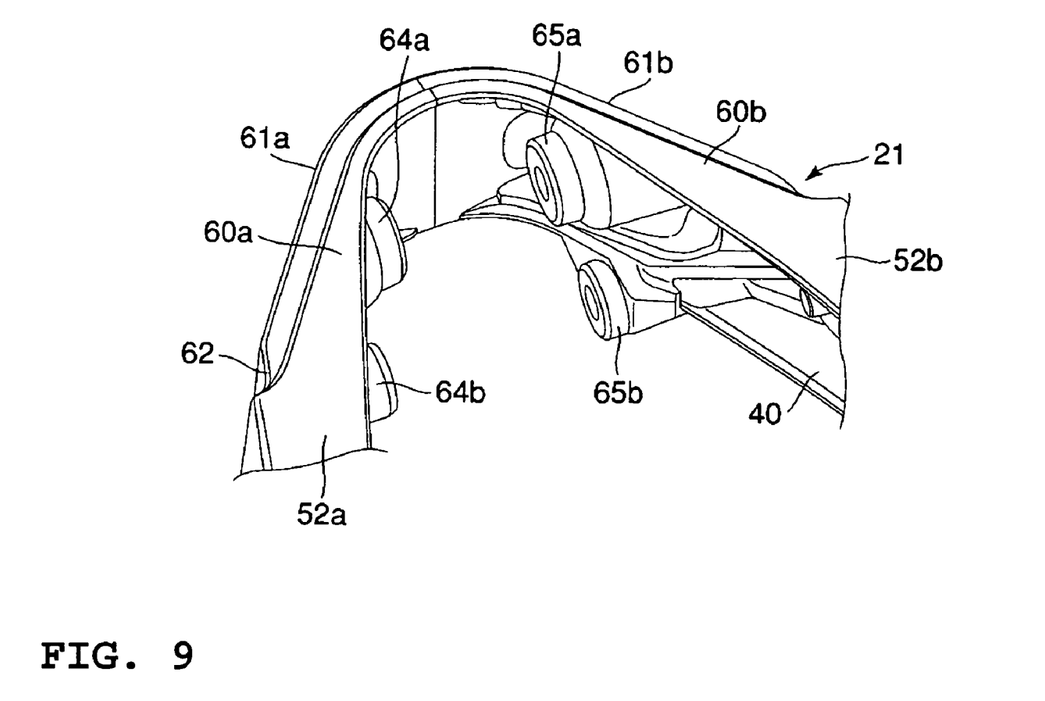
FIG. 9 is a perspective view corresponding to FIG. 8 as seen in the direction of line C.

The forward end portions 60a, 60b of the extensions 52a, 52b are located directly above the cylinder head 14 of the engine 5. As shown in FIG. 5, FIG. 8 and FIG. 9, the forward end portions 60a, 60b are inclined in directions in which they approach each other toward the connecting portion 29 of the gusset portion 25, the forward ends of which are welded in abutment against each other. Therefore, the forward end portions 60a, 60b are formed to be tapered toward the connecting portion 29 and have an external shape following the edges of the upper wall 29c and the lower wall 29d cut out in the shape of a letter V.

In other words, when the frame 2 is viewed directly from above, the forward end portions 60a, 60b of the extensions 52a, 52b are formed in a trangular shape in cooperation with the rear cushion bracket 37, which is a shape advantageous in terms of strength.

The forward end portions 60a, 60b of the extensions 52a, 52b have fitting projections 61a, 61b protruding from their outer surfaces. The fitting projections 61a, 61b are adapted to be fitted into the inner side of the opening 31 of the connecting portion 29. A stepped portion 62 is formed in the boundary section between the peripheral portions of the fitting projections 61a, 61b and the forward end portions 60a, 60b of the extensions 52a, 52b. The stepped portion 62 faces the edges of the side walls 29a, 29b, the edge of the upper wall 29c and the edge of the lower wall 29d facing the opening 31.

The rear brackets 35a, 35b are connected to the gusset portion 25 by fitting the fitting projections 61a, 61b formed on the forward end portions 60a, 60b of the extensions 52a, 52b in the opening 31 of the connecting portion 29 and welding between the stepped portion 62 and the edge of the opening 31 throughout the peripheral edges.

As shown in FIG. 3, in the condition in which the extensions 52a, 52b of the rear arm brackets 35a, 35b are connected to the gusset portion 25, the side walls 39, front walls 40 and rear walls 41 of the extension 52a, 52b adjoin the side walls 29a, 29b, lower wall 29d and upper wall 29c of the connecting portion 29, respectively. In addition, the forward end portions 60a, 60b of the extensions 52a, 52b are covered by the side walls 29a, 29b of the connecting portion 29 from the outsides in the lateral directions of the vehicle, respectively.

As shown in FIG. 8 through FIG. 11, one rear arm bracket 35a has a cylindrical first boss 64a protruding inwardly from the inner surface of its forward end portion 60a, and a second boss 64b protruding downwardly from the lower surface of the forward end portion 60a. Likewise, the other rear arm bracket 35b has a cylindrical third boss 65a protruding inwardly from the inner surface of its forward end portion 60b, and a fourth boss 65b protruding downwardly from the lower surface of the forward end portion 60b. The first boss 64a and the third boss 65a face each other laterally of the vehicle. The second and third bosses 64b, 65b are located in the lower section of the first and third bosses 64a, 65a. In addition, the second boss 64b and the fourth boss 65b face each other in the lateral direction of the vehicle.

Recesses 66 are formed in the side walls 39 of the forward end portions 60a, 60b, respectively. The recess 66 has an opening in the side wall 39 and adjoins the first and third bosses 64a, 65a. The side walls 29a, 29b of the connecting portion 29 have through-holes 67 in regions covering the forward end portions 60a, 60b from the outsides in the lateral directions of the vehicle, respectively. The through-holes 67 face the first and third bosses 64a, 65a, respectively.

Figure 11:
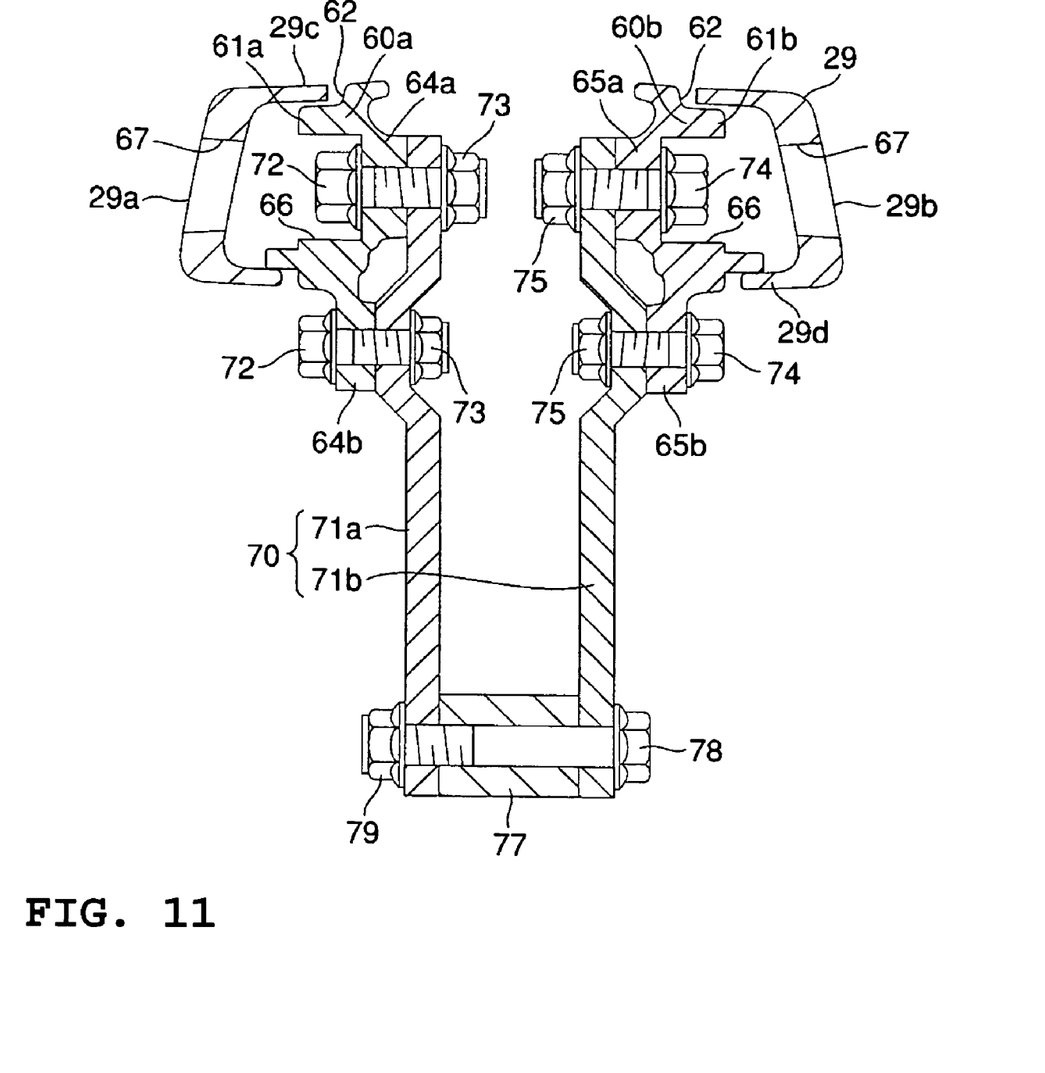
FIG. 11 is a sectional view taken along line F11-F11 of FIG. 10.
Figure 12:
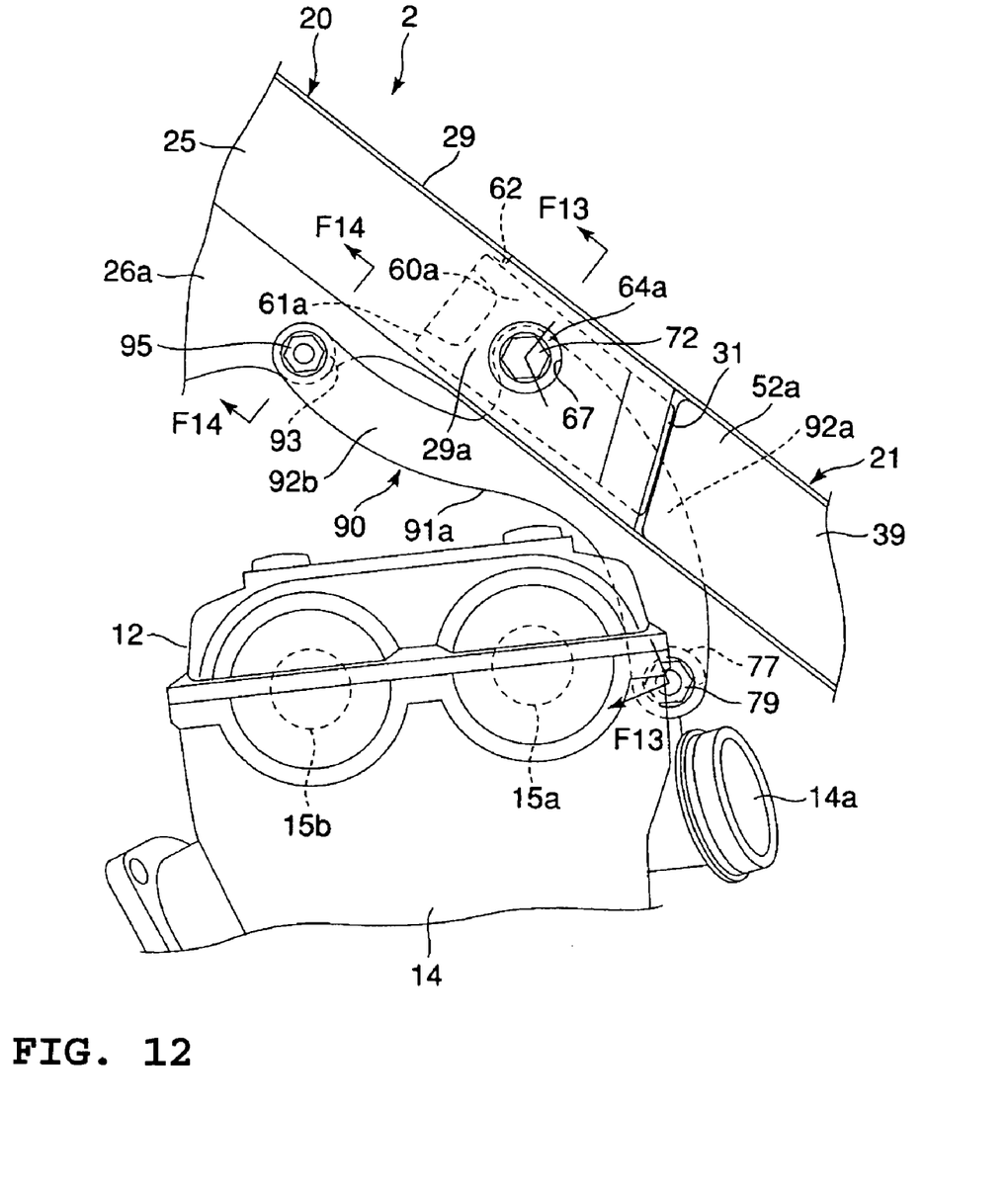
FIG. 12 is a side view of a second embodiment of this invention, with the cylinder head of the engine suspended by the extensions of the rear arm brackets through a hanger bracket.

As shown in FIG. 11 and FIG. 12, a hanger bracket 70 is mounted to the forward end portions 60a, 60b of the extension 52a, 52b. The hanger bracket 70 has a pair of stays 71a, 71b made, for example, from cast products of an aluminum alloy. One stay 71a extends in a straddling fashion between the first and second bosses 64a, 64b of one forward end portion 60a, with two bolts 72 inserted therein, and is fixed to the forward end portion 60a, with inserted ends of these bolts 72 fastened by nuts 73. Likewise, the other stay 71b extends in a straddling fashion between the third and fourth bosses 65a, 65b of the other forward end portion 60b, with two bolts 74 inserted therein and is fixed to the forward end portion 60b, with inserted ends of these bolts 74 fastened by nuts 75.

The bolts 72, 74 for fixing the stays 71a, 71b to the first and third bosses 64a, 65a are inserted in the bosses 64a, 65a through the through-holes 67 provided in the side walls 29a, 29b of the connecting portion 29. The heads of these bolts 72, 74 are sunk in the recesses 66.

Figure 10:
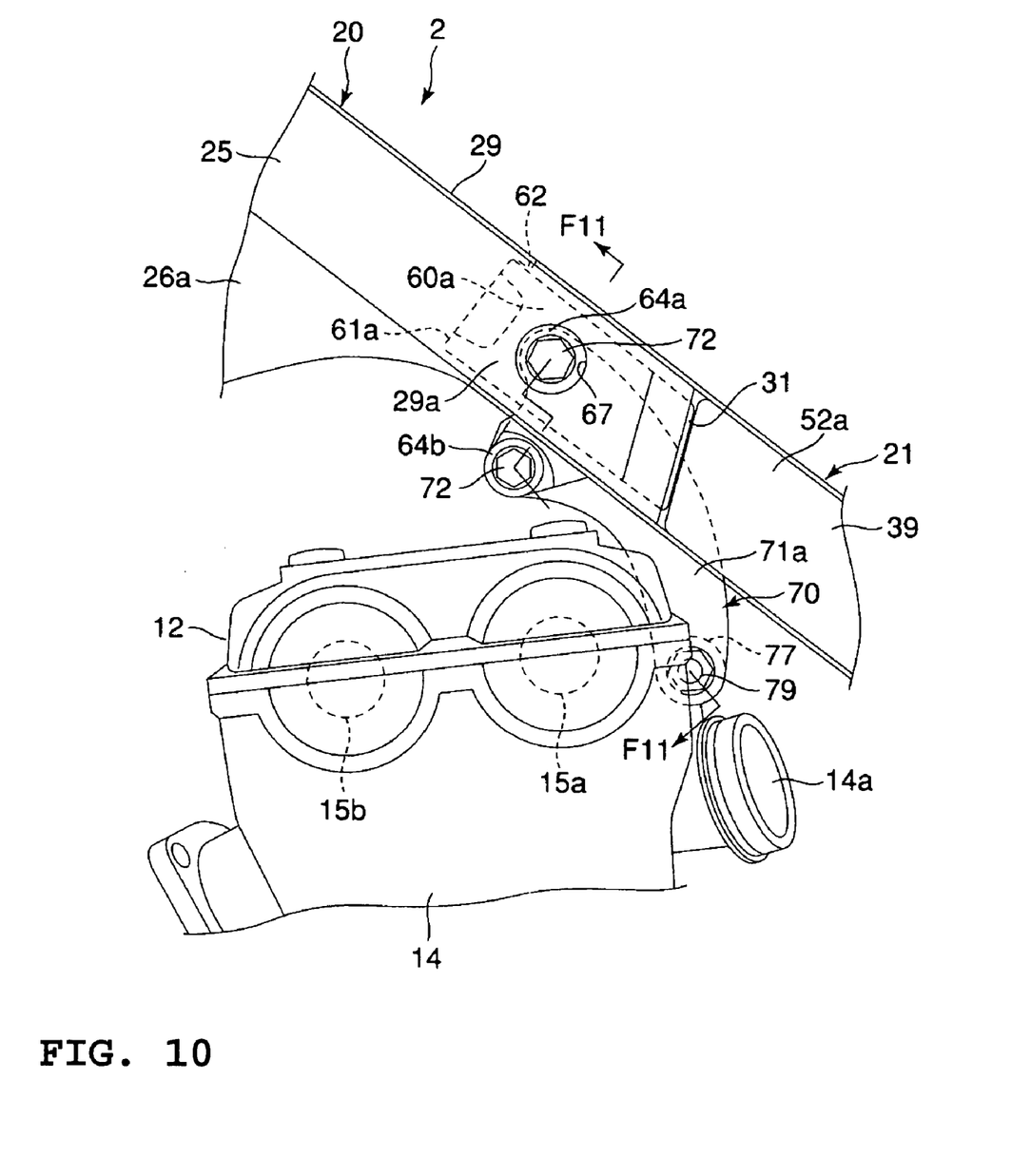
FIG. 10 is a side view of the first embodiment of the present invention, with the cylinder head of an engine suspended by the extensions of the rear arm brackets through a hanger bracket.

The stays 71a, 71b protrude downwardly from the forward end portions 60a, 60b of the extension 52a, 52b toward the rear end of the cylinder head 14 and are disposed parallel with a space left laterally of the vehicle. The stays 71a, 71b are located directly above the intake cam shaft 15a when the motorcycle 1 is viewed sideways.

As shown in FIG. 10 and FIG. 11, the stays 71a, 71b hold, at their lower ends, a boss 77 located above the rear end of the cylinder head 14 therebetween. A bolt 78 is inserted in the stays 71a, 71b at the lower ends across the space therebetween. The bolt 78 passes through the boss 77, and the stays 71a, 71b are fixed to the cylinder head 14, with the inserted end of the bolt 78 fastened by a nut 79.

As a result, the cylinder head 14 of the engine 5 is suspended by the extensions 52a, 52b of the rear arm brackets 35a, 35b through the hanger bracket 70.

In this arrangement as described above, on the rear arm brackets 35a, 35b for supporting the rear arm 4 are formed the extensions 52a, 52b extending toward a region above the cylinder head 14 of the engine 5, and the hanger bracket 70 for suspending the cylinder head 14 is fixed to the forward end portions 60a, 60b of the extensions 52a, 52b. The rear arm brackets 35a, 35b having the extensions 51a, 52b are formed from forged products of high rigidity by nature. Therefore, the rigidity of the mounting portion of the hanger bracket 70 can be secured without need of increasing the thickness of the rear arm brackets 35a, 35b or using particular reinforcement members.

In particular, the forward end portions 60a, 60b of the extensions 52a, 52b are inclined inwardly in the lateral directions of the vehicle toward the forward connecting portion 29, and are welded, at their tips, in abutment against each other. Therefore, the forward end portions 60a, 60b of the extensions 52a, 52b are formed in a triangular shape advantageous in terms of strength in cooperation with the rear cushion bracket 37 when the frame 2 is viewed in plan, and the rigidity of the mounting portion of the hanger bracket 70 becomes that much higher.

As a result, while the mounting portion of the hanger bracket 70 is formed light and compact, the cylinder head 14 can be suspended firmly. Therefore, this invention contributes to the improvement in moving performance of the motorcycle 1.

Further, in this arrangement, the hanger bracket 70 is located in the upper section of the intake cam shaft 15a. In other words, the hanger bracket 70 will not go to a region above the spark plug located between the intake cam shaft 15a and the exhaust cam shaft 15b. As a result, the hanger bracket 70 is prevented from interfering with the spark plug when the spark plug is attached and detached, facilitating the inspection of the spark plug.

Figure 13:
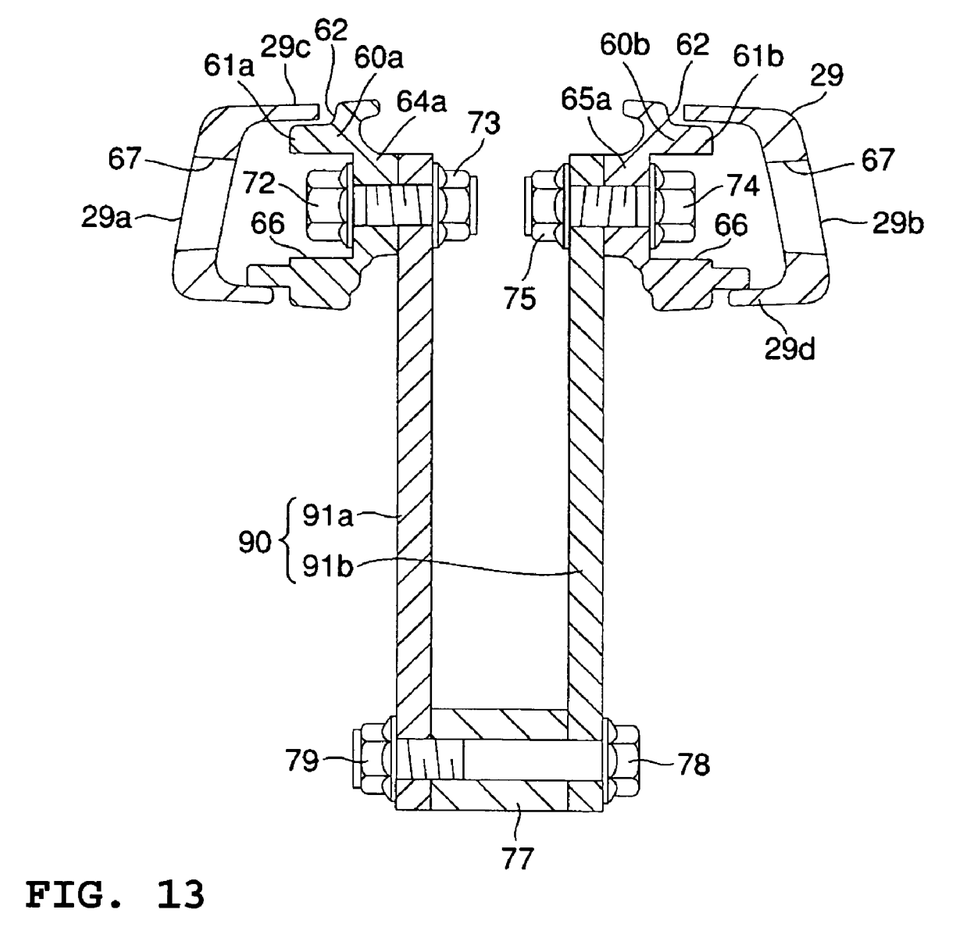
FIG. 13 is a sectional view taken along line F13-F13 of FIG. 12.
Figure 14:
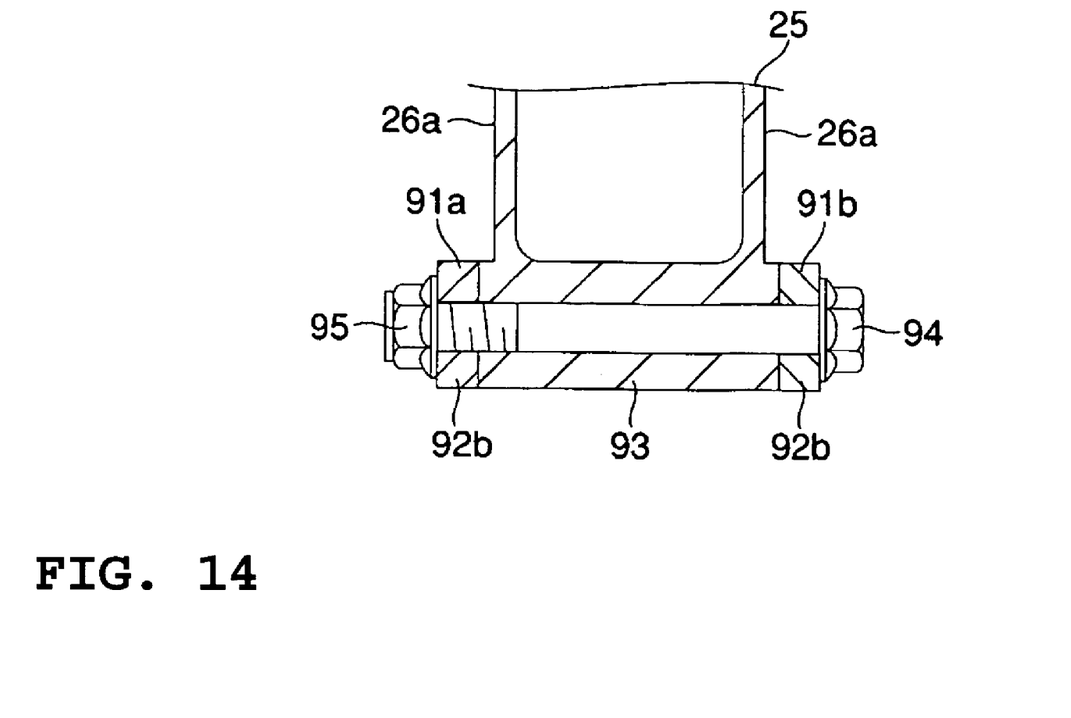
FIG. 14 is a sectional view taken along line F14-F14 of FIG. 12.

This invention is not limited to the foregoing first embodiment, but a second embodiment of this invention will be shown in FIG. 12 through FIG. 14.

The second embodiment is different from the foregoing first embodiment in matters related to a hanger bracket 90 for suspending the cylinder head 14. The main construction other than that is the same as in the first embodiment. Therefore, in the second embodiment, like parts as m the first embodiment are designated by like reference numerals and the description will be omitted.

As shown in FIG. 12 through FIG. 13, the hanger bracket 90 is provided with a pair of stays 91a, 91b made, for example, from forged products of an aluminum alloy. Since these stays 91a, 91b have the same construction, description will be made typically on one stay 91a.

The stay 91a has a first arm section 92a and a second arm section 92b. The first arm section 92a connects the forward end portion 60a of the extension 52a and the boss 77 of the cylinder head 14 therebetween. The first arm section 92a is fixed, at one end, to the boss 64a of the forward end portion 60a of the extension 52a through a bolt 72 and a nut 73. The first arm section 92a protrudes, at the other end, downwardly from the forward end portion 60a of the extension 52a, and is fixed to the boss 77 of the cylinder 14 through a bolt 78 and a nut 79.

The second arm section 92b extends, passing below the connecting portion 29, forwardly from the upper part of the first arm section 92a. The forward end of the second arm section 92b reaches the rear end of the side wall 26a of the gusset portion 25.

As shown in FIG. 14, the gusset portion 25 has a boss 93 extending across the space between the side walls 26a at the rear ends. The second arm sections 92b of the stays 91a, 91b hold, at their forward ends, the boss 93 therebetween. A bolt 94 is inserted in the second arm sections 92b at the forward ends across the space therebetween. The bolt 94 passes through the boss 93, and the second arm sections 92b are fixed to the gusset portion 25, with the passing end of the bolt 94 fastened by a nut 95. Therefore, the hanger bracket 90 for suspending the cylinder head 14 is mounted in a straddling fashion between the gusset portion 25 of the first frame section 20 and the extensions 52a, 52b of the second frame section 21.

In the arrangement as described above, a primary vibration of the engine 5 exerted on the hanger bracket 90 can be released through both the first frame section 20 and the second frame section 21. This mitigates the load on the extensions 52a, 52b of the rear arm brackets 35a, 35b, effecting reduction in thickness of the extensions 52a, 52b as well as in number of the reinforcement ribs 42.

As a result, weight saving of the second frame section 21 is possible, which is more favorable to the improvement in the moving performance of the motorcycle 1.

This invention is not limited to the foregoing embodiments, but may be practiced in embodiments variously changed and modified without departing from the spirit and scope thereof.

In the foregoing embodiments, for example, the forward ends of the extensions of the rear arm brackets are welded in abutment against each other. However, this invention is not limited to that, but the forward ends of the extensions may be separated from each other within the opening range of the opening.

Further, the cylinder section of the engine is not limited to the nearly upright type, but it may be inclined toward the front. In this case, the hanger bracket may suspend the top of the cylinder block rather than the cylinder head.

Furthermore, the frame supporting the engine is not limited to the cradle type. This invention may also be practiced with a diamond type frame in which the lower tube is eliminated, for example, and the crankcase of the engine is utilized as a reinforcement member.

The invention claimed is:

1. An engine supporting device for a motorcycle, the engine supporting device comprising:
   a first frame connected to a head pipe portion at an upper end of the first frame, the first frame extending from the upper end to a lower end of the first frame, the first frame being made of a cast metal;
   a second frame extending from an upper end, connected to the lower end of the first frame, to a lower end supporting a rear arm, the upper end of the second frame including extensions being made of a forged metal; and
   a hanger bracket suspending a cylinder section of an engine, the hanger bracket being directly mounted to the extensions of the second frame; wherein
   a vehicle length direction of the motorcycle extends from a forward end of the motorcycle to a rearward end of the motorcycle, and a vehicle width direction of the motorcycle extends from a left side of the vehicle to a right side of the vehicle and perpendicular to the vehicle length direction; and
   each of the lower end of the first frame, the upper end of the second frame, and the hanger bracket overlap each other in the vehicle width direction of the motorcycle.

2. The engine supporting device for a motorcycle of claim 1, wherein the hanger bracket extends between the extensions of the second frame and supports the cylinder section between the extensions.

3. The engine supporting device for a motorcycle of claim 1, wherein the second frame includes a pair of rear arm brackets supporting the rear arm and facing each other in the vehicle width direction.

4. The engine supporting device for a motorcycle of claim 1, wherein forward ends of the extensions of the second frame are inclined in directions in which the extensions approach each other.

5. The engine supporting device for a motorcycle of claim 1, wherein each of the extensions includes a pair of bosses at a forward end of the extensions, the hanger bracket includes a pair of stays connected to the bosses of the extensions and facing each other in the vehicle width direction, and the stays protrude downwardly from the extensions and hold an end of the cylinder section therebetween at lower ends thereof.

6. The engine supporting device for a motorcycle of claim 1, wherein the first frame includes a hollow, box-shaped gusset portion made of a cast metal and extending rearwardly from the head pipe portion, and the extensions are connected to the gusset portion above the cylinder section.

7. The engine supporting device for a motorcycle of claim 6, wherein the hanger bracket protrudes toward the cylinder section of the engine from a location where the extensions are connected to the gusset portion.

8. The engine supporting device for a motorcycle of claim 6, wherein the hanger bracket includes an arm section above the cylinder section and extending toward the forward end of the motorcycle, and a forward end of the arm section is connected to the gusset portion.

9. A motorcycle comprising:
a cast frame including an upper end connected to a head pipe portion supporting a front fork, the cast frame extending from the upper end to a lower end of the cast frame;
a forged frame extending from an upper end, connected to the lower end of the cast frame, to a lower end supporting a rear arm; the forged frame including extensions connected to the cast frame;
an engine supported between the cast frame and the forged frame, the engine including a cylinder section; and
a hanger bracket directly mounted to the extensions of the forged frame and supporting the cylinder section; wherein
the forged frame is connected to the cast frame by a portion of the extensions to which the hanger bracket is mounted;
a vehicle length direction of the motorcycle extends from a forward end of the motorcycle to a rearward end of the motorcycle, and a vehicle width direction of the motorcycle extends from a left side of the vehicle to a right side of the vehicle and perpendicular to the vehicle length direction; and
each of the lower end of the cast frame, the upper end of the forged frame, and the hanger bracket overlap each other in a vehicle width direction.

10. The motorcycle of claim 9, wherein
the cast frame includes a gusset portion having a hollow, closed cross-section, the gusset portion extending rearwardly from the head pipe portion;
the forged frame includes a pair of rear arm brackets supporting the rear arm and facing each other in the vehicle width direction of the motorcycle;
the extensions of the forged frame are connected to the gusset portion of the cast frame; and
the hanger bracket includes a first arm portion connecting the extensions to the cylinder section, and a second arm portion connecting the first arm portion to the gusset portion.

11. The motorcycle of claim 10,
wherein the extensions of the forged frame are inclined in directions in which the extensions approach each other toward the gusset portion, and forward ends thereof are connected to each other.

12. The motorcycle of claim 10, wherein the first arm portion of the hanger bracket extends towards the cylinder section, and the second arm portion of the hanger bracket extends towards the head pipe portion from a location where the extensions are connected to the gusset portion.

13. The motorcycle of claim 9, wherein
the forged portion includes a pair of rear arm brackets supporting the rear arm, and forward ends of the extensions are connected to each other above the cylinder section;
each of the extensions includes a pair of bosses, the hanger bracket includes a pair of stays connected to the bosses of the extensions and facing each other in the vehicle width direction, and the stays protrude downwardly from between the extensions and support an end of the cylinder section therebetween at lower ends thereof; and
the pair of boss portions are provided at the forward ends of the extensions.

14. A motorcycle comprising:
a frame including:
a cast portion including an upper end connected to a head pipe portion, the cast portion extending from the upper end to a lower end of the cast portion; and
a forged portion extending from an upper end, connected to the lower end of the cast portion, to a lower end supporting a rear arm;
an engine supported by the frame and including a cylinder section; and
a hanger bracket directly connected to the forged portion and the cylinder section; wherein
the forged portion includes a pair of rear arm brackets supporting the rear arm, extensions at the upper end of the forged portion connected to the lower end of the cast portion, and forward ends of the extensions are connected to each other above the cylinder section;
a vehicle length direction of the motorcycle extends from a forward end of the motorcycle to a rearward end of the motorcycle, and a vehicle width direction of the motorcycle extends from a left side of the vehicle to a right side of the vehicle and perpendicular to the vehicle length direction; and
each of the extensions includes a pair of bosses, the hanger bracket includes a pair of stays connected to the pair of bosses and facing each other in a vehicle width direction of the motorcycle, and the stays protrude downwardly from between the extensions and support an end of the cylinder section therebetween at lower ends thereof;
the pair of boss portions are provided at the forward ends of the extensions; and
each of the lower end of the cast portion, the upper end of the forged portion, and the hanger bracket overlap each other in the vehicle width direction.

15. The motorcycle of claim 14, wherein the hanger bracket includes a first arm portion connecting the forged portion and the cylinder section therebetween, and a second arm portion connecting the first arm portion and the cast portion therebetween.

* * * * *